United States Patent Office 3,429,687
Patented Feb. 25, 1969

3,429,687
HERBICIDAL MIXTURE AND METHOD OF USE
Edward D. Weil, Lewiston, N.Y., assignor to Hooker Chemical Corporation, Niagara Falls, N.Y., a corporation of New York
No Drawing. Original application Aug. 12, 1963, Ser. No. 301,602, now Patent No. 3,328,454, dated June 27, 1967. Divided and this application Dec. 2, 1966, Ser. No. 623,150
U.S. Cl. 71—80      4 Claims
Int. Cl. C07c *141/18;* A01n *9/14*

ABSTRACT OF THE DISCLOSURE

A method for destroying weeds comprises applying to the locus to be treated a phytotoxic amount of a polyhalobenzyloxyalkanol sulfate. Mixtures of such sulfates also may be employed and other herbicidal compounds may be applied at the same time to the locus to be treated.

---

This is a division of my application Ser. No. 301,602, filed Aug. 12, 1963 now U.S. Patent No. 3,328,454.

This invention relates to new compositions of matter which are benzyloxyalkanol sulfate salts and to a process for preparing these salts. More specifically, the present invention is concerned with new halobenzyloxyalkyl sulfate salts which are effective as herbicides alone or in combination with certain other herbicides, and which are also effective as herbicide solubilizing agents.

The use of sodium borates and combinations of sodium chlorate with sodium borates is known for general weed control, especially on non-agricultural lands, such as roadsides, railroad rights-of-way, fencerows, and in industrial areas, and also for control of persistent localized perennial weed populations in farm lands. These inorganic herbicides, being water soluble, may tend to leach below the soil surface after a time, allowing regrowth of weed seedlings at the surface. It has been desired to incorporate an adjuvant herbicide into sodium borate or sodium chlorate to prevent the possibility of any regrowth. It has also been desired to find herbicides which, in conjunction with sodium chlorate and/or sodium borate, would give better overall weed control (or lower cost weed control) than either component alone.

Attempts have been made to incorporate 2,4-dichlorophenoxyacetic acid or trichlorobenzoic acid into these inorganic herbicides. Such formulations have been used dry, since if it is attempted to dissolve them in water, the relatively insoluble sodium 2,4-dichlorophenoxyacetate or sodium trichlorobenzoate is precipitated. The use of emulsifiable or wettable powder forms of 2,4-D or trichlorobenzoic acid is not satisfactory in solutions of inorganic salts because the surface active agents (surfactants) used to effect emulsification or wetting fail to perform satisfactorily under conditions of high ionic strength.

It is an object of this invention to make available highly water-soluble persistent herbicides which are compatible with aqueous borates and/or chlorates. It is also an object to produce herbicides useful per se and as complementary and synergistic components of certain herbicidal mixtures, especially with sodium chlorate and/or sodium borate.

A further object of the invention is to obtain a water-soluble herbicide having surfactant properties. Another object of the invention is to make available a water-soluble compound having the ability to render water-soluble other herbicides such as 2,4-D, 2,4,5-T, and trichlorobenzoic acid and salts thereof not ordinarily, sufficiently soluble in water. Other objects will be made evident hereinafter.

The compositions of this invention are described by the following general formula:

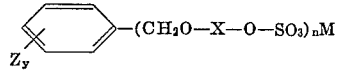

wherein Z is a halogen, e.g., chlorine, bromine, $y$ is from 2 to 4, X is an alkylene radical of at least two carbon atoms which may be unsubstituted or substituted by oxa, hydroxy, alkyl, or hydroxyalkyl groups, and preferably contains from 2 to about 20 carbon atoms, M is a cation preferably selected from the group consisting of metal cations, ammonium, and substituted ammonium cations, and $n$ represents the valence of the cation. Oxa-substituted alkylene radicals are also designated as being alkylene-oxy-alkylene radicals.

The halobenzyl radical may be of various isomeric and analogous structures such as the 2,3,4-, 2,3,5-, 2,3,6-, 2,4,5-, 2,4,6-, 2,4-, 2,3,5,6-, and 3,4,5-polychloro and -bromo configurations and includes various mixtures thereof.

Illustrative examples of the X substituent include ethylene, trimethylene, pentamethylene, 1,2-propylene, 1,2-butylene, trimethylene, 2,3-dimethylethylene, amylene, 2-hydroxytrimethylene, 2,3,4,5-tetrahydroxyhexamethylene, 2-hydroxymethyl-2-methyltrimethylene, 2,2 - di(hydroxymethyl)trimethylene, 3-oxapentamethylene, 3,6 - dioxaoctamethylene, octylene, and 2,5-dimethyl - 3 - oxapentamethylene.

Other alkylene radicals acting in the manner described herein can be utilized in practicing the invention. The alkylene radical usually has a carbon chain length of from two to about 20 carbon atoms and from 2 to 8 carbons are preferred.

The cation M may be any suitable cation, as for example:

(1) Alkali metal, such as sodium, potassium, lithium, and the like;

(2) Alkaline earth metals and heavy metals such as Mg, Ca, Al, Fe, Cu, Zn, Pb, Ni, and the like;

(3) Ammonium and substituted ammonium such as:

(a) The alkylammonium salts such as monoalkylammonium, dialkylammonium or trialkylammonium preferably having from 1 to 18 carbon atoms in each alkyl group, the totality of carbon atoms preferably being not more than 18, the alkanolammonium salts such as monoalkanolammonium, dialkanolammonium, or trialkanolammonium preferably having 2 or 3 carbon atoms in each alkanol group, the mixed alkylalkanolammonium salts such as monoalkyl monoalkanolammonium, dialkyl monoalkanolammonium, or monoalkyl dialkanolammonium preferably having from 1 to 4 carbon atoms in each alkyl group and from 2 to 3 carbon atoms in each alkanol group.

(b) The monoalkylammonium salts such as monomethylammonium, monoethylammonium, monopropylammonium, monobutylammonium, monoamylammonium, monohexylammonium, monoheptylammonium, monooctylammonium, monononylammonium, monododecylammonium, monoundecylammonium, monododecylammonium, and similar monoalkylammonium salts.

(c) The dialkylammonium salts such as dimethylammonium, diethylammonium, dipropylammonium, dibutylammonium, diamylammonium, dihexylammonium, methylethylammonium, ethylpropylammonium, propylbutylammonium, butylamylammonium, amylhexylammonium, methylundecylammonium, and similar dialkylammonium salts.

(d) The trialkylammonium salts such as trimethylammonium, triethylammonium, tripropylammonium, tributylammonium, methyldiethylammonium, ethyldipropylammonium, propyldibutylammonium, methyldiamylammonium, ethyldiamylammonium, methylethylpropylammonium, ethylpropylbutylammonium, and similar salts.

(e) The monoalkanolammonium salts such as monoethanolammonium, monopropanolammonium, and similar salts.

(f) The dialkanolammonium salts such as diethanolammonium, dipropanolammonium, ethanolpropanolammonium and similar salts.

(g) The trialkanolammonium salts such as triethanolammonium, tripropanolammonium, ethanoldipropanolammonium, propanoldiethanolammonium, and similar salts.

(h) The monoalkyl monoalkanolammonium salts such as methylethanolammonium, ethylethanolammonium, propylethanolammonium, butylethanolammonium, methylpropanolammonium, ethylpropanolammonium, propylpropanolammonium, butylpropanolammonium, and similar salts.

(i) The dialkyl monoalkanolammonium salts such as dimethylethanolammonium, diethylethanolammonium, dipropylethanolammonium, dibutylethanolammonium, dimethylpropanolammonium, diethylpropanolammonium, dipropylpropanolammonium, dibutylpropanolammonium, methylethylethanolammonium, methylethylpropanolammonium, ethylpropylethanolammonium, ethylpropylpropanolammonium, propylbutylethanolammonium, propylbutylpropanolammonium, and similar salts.

(j) The monoalkyl dialkanolammonium salts such as methyldiethanolammonium, ethyldiethanolammonium, propyldiethanolammonium, butyldiethanolammonium, methyldipropanolammonium, ethyldipropanolammonium, propyldipropanolammonium, butyldipropanolammonium, methylethylpropanolammonium, ethylethanolpropanolammonium, propylethanolpropanolammonium, butylethanolpropanolammonium, and similar salts.

(k) The tetrabutylammonium, dimethylstearyl ammonium, cyclohexylammonium, morpholinium, N-methylmorpholinium, anilinium, ethylenediammonium, triethylenetriammonium, hydrazinium, hydroxylammonium, mono-, di-, or triethanolammonium, and other alkylhydroxyalkyl-, aryl-, cycloalkyl-, or other hydrocarbyl-substituted ammonium.

It is, of course, appreciated that other cations acting in the manner described herein and which do not adversely effect the reaction mechanism can be employed.

Among the compounds included in the present invention are for example:

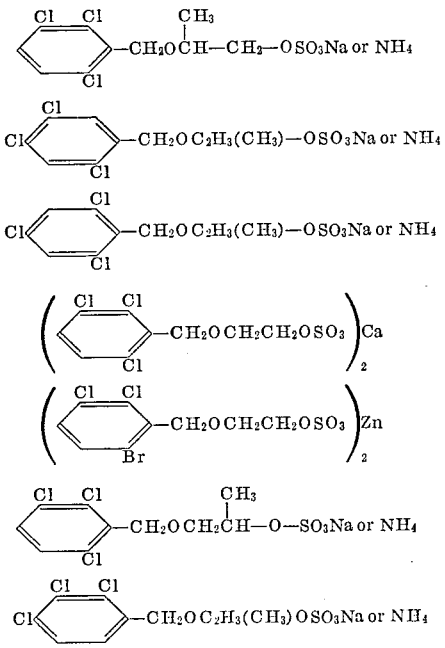

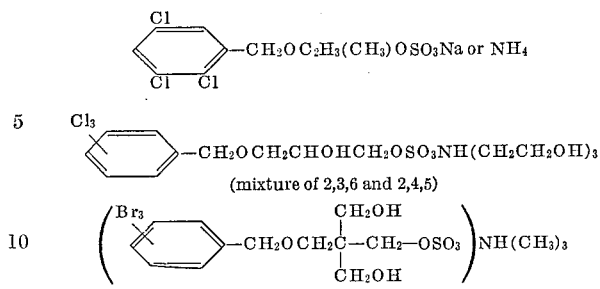

The present invention also encompasses the dihalo and tetrahalo analogs of the compounds described above. These halo and tetrahalo benzyloxyalkyl sulfate salts include, for example

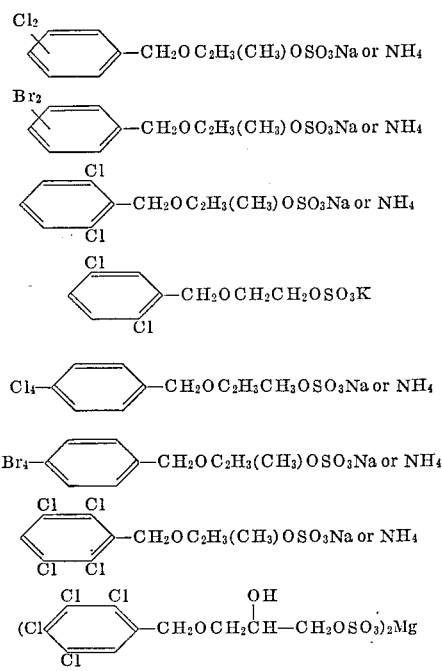

and the like.

These compounds are made analogously to the trichloro analogs disclosed above. In respect to their herbicidal properties per se, they are not as effective as the preferred trichloro compositions but exhibit herbicidal activity and serve to synergise the active trichloro compounds when present in admixture therewith. The dichloro and tetrachloro compounds of the invention also exhibit valuable solubilizing and surfactant properties. Mixtures containing principally the preferred trichloro compounds of the invention accompanied by lesser amounts of the dichloro or tetrachloro compounds are particularly economical in relation to the herbicidal activity observed.

For reasons of relatively lower cost and higher activity, the preferred compounds are those having three chlorines in the ring and wherein at least 20 percent of the trichlorobenzyl groups have the 2,3,6-trichlorobenzyl configuration and wherein the substituent X is selected from the group consisting of 1,2-propylene, i.e., —CH(CH$_3$)CH$_2$— or —CH$_2$CH(CH$_3$)— and ethylene (i.e., —CH$_2$CH$_2$—), and wherein M is selected from the group consisting of alkali metal, an alkaline earth metal and ammonium. By alkaline earth metal is meant those metals in Group IIA of the Periodic Chart such as calcium, magnesium, barium and strontium. The pure 2,3,6-trichlorobenzyl isomers are especially active. Also highly active are mixtures of about 20–80 percent 2,3,6- the remainder being mainly 2,4,5-, 2,3,4-, and 2,4,6-isomers. These last three isomers when alone, may be found to be of relatively lower herbicidal effect but act synergistically in admixture with at least about 20 percent of the 2,3,6-isomer.

Because of their availability from the trichlorination of toluene and/or o-chlorotoluene, mixtures of 20–80 percent 2,3,6-, the remainder being 2,3,4-, 2,4,5-, and 2,4,6-trichlorobenzyl isomers are especially economical and are preferred embodiments in respect to the isomeric composition of the trichlorobenzyl moiety.

The sulfates of the invention are prepared from the corresponding polyhalobenzyloxyalkanols which are, in turn, prepared as described in U.S. Patent 3,006,967 or in analogous or other suitable manner. The sulfation is effected by a method that has been found especially effective, namely reaction of the alcohol with a sulfating reagent generally chosen from the group consisting of strong sulfuric acid, sulfuric anhydride, halosulfonic acid, and sulfamic acid. In the case of the first three reagents, the initial product of sulfation is the acid sulfate of the polyhalobenzyloxyalkanol, and this acid product is neutralized by using a base such as caustic soda, lime, borax, ammonia, or other basic substance yielding the desired cation. In the case of sulfamic acid, the initial sulfation product is the ammonium salt, which may be used as such or may be converted to another salt by addition of a base and distillation off of the evolved ammonia. For example, addition of aqueous caustic potash to the ammonium salt causes evolution of ammonia and generates the potassium salt of the polyhalobenzyloxyalkanol sulfate.

The temperature utilized to effect the reaction is in the range of about −20 degrees centigrade to about 150 degrees centigrade. With more reactive sulfating agents, such as sulfur trioxide and chlorosulfonic acid, temperatures in the lower end of the range are preferred, such as about −20 degrees centigrade to about 50 degrees centigrade, while with less reactive sulfating agents, such as sulfuric acid, temperatures in the range of 50 degrees centigrade to 150 degrees centigrade are preferably employed. Of course, temperatures are chosen to produce a satisfactory product and various temperatures may be utilized which do not adversely affect the reaction mechanism.

Solvents, although not necessary, can be utilized if desired. Solvents such as ethyl ether and ethylene dichloride, which do not adversely affect the reaction, are among those preferred.

Generally the ratio of sulfating agent to polyhalobenzylalkanol will depend on the reagents employed and the product desired. Generally, at least one molar equivalent of sulfating agent is employed, although other molar equivalents such as five can be utilized.

The compositions of this invention are useful as herbicides and may be formulated with sodium borate and sodium chlorate for such use, as will be demonstrated in the working examples. It is surprising and unexpected that these compounds of the invention, in spite of their remarkable water solubility, nonetheless exert highly residual (long-lasting) herbicidal effects on the soil to which they are applied. This behavior is especially enhanced in combination with sodium chlorate and/or sodium borate, and is inexplicable at present because one would expect the water soluble compounds of the invention to be leached out of the soil by rainfall just as the water soluble inorganic herbicides may be leached out.

Useful herbicidal combinations showing greater than additive effects are found in the range of from 0.1 percent to 25 percent of the compound of the invention, relative to sodium chlorate or sodium borate or mixtures thereof. At the lower levels of the sulfate, its effectiveness is usually principally against seedlings, and at the higher levels, it is also highly effective against established perennial weeds. Also, the percentage to be used in any given formulation will depend on the duration of weed control required, application rate, weed species, weather and soil conditions, and other factors.

In terms of rates of application per acre, the compounds of the invention are found most useful at from 1 to 100 pounds per acre, the lowest rates being appropriate for annual weed seedling control, the higher rates, e.g., above 10 pounds per acre, for long term control of established perennial weeds. It will be evident to one skilled in the art that the most preferred rate in any given situation will be dependent on weed species, stage of weed growth, soil type, weather, and economic considerations.

The compounds of the invention may be used in combination with other herbicides, such as 2,4-D, 2,4,5-T, aminotriazole, trichlorobenzoic acid, trichlorophenylacetic acid, simazine, atrazine, and other triazine herbicides, monuron, diuron, linuron, and other urea herbicides, sodium trichloroacetate, sodium α,α-dichloropropionate, sodium pentachlorophenate, N-isopropylbromouracil, and 4-amino-3,5,6-trichloropicolinic acid (and salts thereof). The compounds of the invention not only contribute herbicidal activity to mixtures with these and other herbicides but also exert solubilizing effect on those herbicides which are not adequately soluble in water. Additionally, by virtue of their surface active properties the compounds of the invention aid such mixtures to wet the foliage of the weeds on which they are applied and thereby further increase herbicidal effectiveness.

Generally, the compound of the present invention is employed in an amount of 0.5 part to 1000 parts by weight of the compound of this invention to about 1 to 1000 parts by weight of other herbicides in order to obtain these properties, with the preferred ranges being listed below. It is, of course, appreciated that various effective amounts of the compounds of this invention can be utilized, and the application rates will often be dependent on the particular circumstances.

Illustrations of some useful and advantageous mixtures of the compounds of the invention include: (a) 1–10 parts of sodium 2,3,6-trichlorobenzyloxyethyl sulfate, 1–10 parts of aminotriazole, 100 parts of water for use against Canada thistle and other perennial weeds; (b) 1–20 parts of sodium trichlorobenzyloxypropyl sulfate and 1–20 parts of sodium trichloroacetate or α,α-dichloropropionate, 100 parts of water for use against weed populations containing quackgrass, Johnson grass or other perennial weedy grasses; (c) 1–10 parts of magnesium trichlorobenzyloxypropyl sulfate, 5–20 parts of magnesium chlorate and 100 parts of water as a defoliant for cotton, in which application the sulfate contributes both excellent wetting and regrowth inhibiting properties; (d) 1–10 parts of ammonium trichlorobenzyloxypropyl sulfate and 5–50 parts of ammonium sulfamate for control of woody perennials and brush, applied either dry or in aqueous solution, the sulfate being especially efficacious in preventing regrowth which would otherwise occur; (e) 1–10 parts of sodium 2,3,6-trichlorobenzyloxypropyl sulfate, 0.1–10 parts of sodium 4-amino-2,3,6-trichloropicolinate, and 100 parts of sodium chlorate, the sulfate serving not only to contribute herbicidal effect but to prevent "salting out" of the picolinate by the sodium chlorate in aqueous concentrates, thus making it more convenient to take advantage of herbicidal synergism between the sodium chlorate and the 4-amino-3,5,6-trichloropicolinic acid (and its salts) when used on plants, such as bindweed, in these proportions; (f) 1–10 parts of sodium 2,3,6-trichlorobenzyloxypropyl sulfate, 0.1–10 parts of 4-amino-2,3,6-trichloropicolinate, 1–10 parts of either sodium 2,3,6-trichlorophenylacetate or sodium polychlorobenzoate (PBA) or other salts thereof in aqueous solution the compound of the invention serving to keep the sodium salt in aqueous solution and making it possible to obtain synergism between the 4-amino-2,3,6-trichloropicolinate and the 2,3,6-trichlorophenylacetate or polychlorobenzoate; (g) 1–10 parts of sodium polychlorobenzoate, 1–10 parts of sodium trichlorobenzyloxypropyl sulfate, and 10–1000 parts of sodium chlorate, the sulfate serving not only as a herbicide but also to prevent "salting out" of the sodium polychlorobenzoate by the sodium chlorate; and (h) 0.2–10 parts of sodium 4-amino-2,3,6-trichloropicolinate, 1–10 parts of sodium 2,3,6-trichlorobenzyloxypropanol, 1–10 parts of sodium 2,3,6-trichlorobenzyloxypropyl sulfate, the sulfate serving not only to contribute herbicidal action but also keeping the trichlorobenzyloxypropanol in solution, making it more convenient to take advantage of the herbicidal synergism between the trichlorobenzyloxypropanol and the 4-amino-3,5,6-trichloropicolinic acid when used on plants such as bindweed in those proportions. Many other formulation modifications of the compounds of the invention will be obvious to one skilled in the art upon reading the present disclosure.

In order that those skilled in the art may better understand the present invention, the manner in which it may be practiced, the following specific examples are given.

In the specification, examples and claims, parts are in parts by weight and temperatures are in degrees centigrade, unless otherwise stated.

Example 1

The trichlorobenzyloxypropanol employed as starting material was a technical product prepared by chlorinating toluene to trichlorotoluene using chlorine gas and using ferric chloride as catalyst, side-chain monochlorinating the resultant trichlorotoluene with chlorine under photochemical activation conditions, and reacting the resultant trichlorobenzyl chloride with the sodium salt of propylene glycol in the presence of excess propylene glycol. This product is a water-insoluble syrup containing about 92 percent trichlorobenzyloxypropanol and about 8 percent bis(trichlorobenzyl)ether of propylene glycol. The isomer distribution is approximately 40–50 percent, 2,3,6-, 20–30 percent 2,4,5-, 10–15 percent 2,3,4-, and 5–10 percent 2,4,6-trichlorobenzyloxypropanol.

A mixture of 1400 parts of sulfamic acid and 3726 parts of this technical trichlorobenzyloxypropanol, and 312 parts of urea (a catalyst for the reaction), is stirred and gradually warmed to 120 degrees centigrade (removing source of heat and applying cool water when an exotherm is noted). The temperature is held at 120 degrees centigrade for 2 hours. The mixture is then cooled. When the ammonium salt is the desired product, the mixture is used as is, after neutralization of the excess sulfamic acid by cautious addition of aqueous ammonium hydroxide to a pH of 8–9. The ammonium salt is a thick water-soluble syrup.

The sodium salt is produced from the ammonium salt as follows:

The product from the above reaction is held at 80 degrees centigrade with stirring and 664 parts of sodium hydroxide in 1250 parts of water is added slowly over 30 minutes, during which time ammonia is copiously evolved. Then a vacuum is applied and the mixture held at 50–60 degrees centigrade for one hour to remove substantially all the remaining ammonia. The thus produced quantitative amount of sodium salt in water is a thick syrup which is diluted with water to two gallons thereby obtaining a clear water-miscible solution. To depress the freezing point of the formulation, part of the water may be replaced by isopropanol, to make a product comprising 10–60 percent isopropanol. By using caustic potash instead of caustic soda, the potassium salt is likewise prepared. By using magnesium hydroxide instead of soda, the magnesium salt is similarly made. By using triethanolamine instead of soda, the triethanolamine salt is similarly prepared. All are water-soluble salts.

In the same manner and at the same or equivalent proportions, the dihalobenzyloxyalkanol sulfates and the tetrahalobenzyloxyalkanol sulfates are prepared from the corresponding dihalobenzyloxyalkanol, and tetrahalobenzyloxyalkanols, which starting materials are made by the reaction of Example 1, with halogenation being stopped sooner in the dihalo compounds or later, for the tetrahalo compounds, as desired. The bromine analogues are made by substitution of bromine for chlorine in the halogenation steps and otherwise may be processed in similar manner.

In a similar manner to Example 1 and at similar proportions the pure sodium and ammonium salts of 2,3,6-trichlorobenzyloxypropyl sulfate are prepared.

Example 2.—Formulation with sodium borate and sodium chlorate

A concentrated aqueous solution (2 pounds per gallon) of the product of Example 1 was sprayed onto a warm tumbling mass of granular sodium metaborate and sodium chlorate (a commercial mixture known as Monoborchlorate, containing 68 percent sodium metaborate tetrahydrate, 30 percent sodium chlorate, and 2 percent inert ingredients) in a rotating drum until the mixture contained 1 percent by weight of 2,3,6-trichlorobenzyloxypropyl sulfate sodium salt. The product was a completely water-soluble dry granular solid.

Example 3—Use as solubilizing agent for a water-insoluble herbicide

A solution in water is made up by mixing the following ingredients:

Trichlorobenzyloxypropanol (45% 2,3,6
  isomer) _____pound__ 1
Sodium trichlorobenzyloxypropyl sulfate (45% 2,3,6
  isomer) _____pound__ 1
Water, to 1 gallon.

This yielded a clear aqueous concentrate which could be diluted with water in any proportion without separation of the trichlorobenzyloxypropanol. By contrast, trichlorobenzyloxypropanol alone has a solubility in water of less than 0.1 percent.

Example 4.—Use as solubilizing agent for a poorly-soluble herbicide

A solution of 10 parts of the sodium salt of 2,4-dichlorophenoxyacetic acid (2,4-D) in 250 parts of water is prepared. When thirty parts of this solution is added to 70 parts of a 20 percent solution of commercial Monobor-chlorate (a U.S. Borax product containing 30 percent sodium chlorate and 68 percent sodium metaborate tetrahydrate), an immediate precipitation of the sodium 2,4-dichlorophenoxyacetate occurs. A similar result is observed when the dimethylamine salt or other amine salt of 2,4-D is used, since the sodium salt is formed by metathesis.

By contrast, when 10 parts of sodium trichlorobenzyloxypropyl sulfate (40–50 percent 2,3,6-, 20–30 percent 2,4,5-, 5–15 percent 2,3,4-, 5–10 percent 2,4,6-isomer) is also dissolved in Monobor-chlorate solution, the sodium 2,4-dichlorophenoxyacetate remains in solution.

Solutions made in this manner containing sodium 2,4-dichlorophenoxyacetate, sodium trichlorobenzyloxypropyl sulfate, sodium borate, and sodium chlorate are sprayed at 50–400 gallons per acre along railroad tracks and result in rapid weed kill (within 5–10 days) and prevention of weed regrowth.

In the preceding comparative composition, when sodium 2,4,5-trichlorophenoxyacetate is substituted for sodium 2,4-D in whole or part, as the free acid or as amine salt, precipitation also occurs. The 2,4-D and/or 2,4,5-T can be introduced also as the free acid or as amine salt.

Example 5.—Herbicidal use

A field infested with seeds of ragweed, pigweed and lambsquarters was plowed, disked, and promptly sprayed with an aqueous solution of sodium 2-(2,3,6-trichlorobenzyloxy)ethyl sulfate (prepared from 2-(2,3,6-trichlorobenzyloxy)ethanol by a process like that of Example 1), at the rate of 3 pounds of active ingredient per acre. Approximately one month later, at a time when an adjacent unsprayed area had a heavy population of these weeds, the treated area was substantially weed-free.

Example 6.—Herbicidal use in combination with sodium chlorate

An area of heavily perennial-weed infested abandoned farm land was divided into plots and treated in the spring with the herbicides listed below, in the form of aqueous solutions. Late in the following summer, the degrees of controls of the various principal weed species were noted, relative to adjacent untreated areas, with the results shown in the table. Degree of control (percent) is $$100 \left( \frac{\text{number of weeds in control area} - \text{number of weeds in treated area}}{\text{number of weeds in control area}} \right)$$

| Herbicide | Degree of control of indicated species (percent) | |
| --- | --- | --- |
|  | Wild carrot | Quackgrass |
| Sodium chlorate (200 lbs./acre) | 50 | 50 |
| Sodium trichlorobenzyloxypropyl sulfate (45% 2,3,6-isomer) (10 lbs./acre) | 20 | 20 |
| Combination of above | 90 | 95 |

Example 7.—Herbicidal use in combination with sodium chlorate and sodium borate

The product of Example 2 and a similar borate-chlorate formulation omitting the compound of the invention were applied at 1,000 pounds (total) per acre to separate adjacent areas infested with Johnson grass. After one year the area treated only with the borate-chlorate formulation was found to be reinfested with new growth of Johnson grass whereas the area treated with the formulation of Example 2 was substantially free of Johnson grass. A parallel test with the equivalent amount of sodium 2,3,6-trichlorobenzyloxypropylsulfate alone (without the borate and chlorate) shows almost no reduction in Johnson grass population (at this rate of application).

While there have been described various embodiments of the invention, the methods and elements described are not intended to be understood as limiting the scope of the invention, as it is realized that changes therewithin are possible, and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A method for the control of weeds which comprises applying to the locus to be treated a phytotoxic amount of a polyhalobenzyloxyalkanol sulfate of the formula:

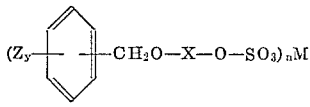

wherein
  (a) Z is a halogen selected from the group consisting of chlorine and bromine,
  (b) y is from about 2 to 4 inclusive,
  (c) X is selected from the group consisting of alkylene, alkylene-oxy-alkylene, hydroxyalkylene, alkylalkylene, and hydroxyalkylalkylene, said radicals containing 2 to 20 carbon atoms,
  (d) M is a cation selected from the group consisting of alkali metal, alkaline earth metal, ammonium alkyl substituted ammonium, hydroxyalkyl substituted ammonium, aluminum, iron, copper, zinc, lead and nickel, wherein each of said alkyl groups is of 1 to 18 carbon atoms,
  (e) n represents the valence of said cation;

at a rate of about 1 to 100 pounds per acre, and applying to the locus a compound selected from the group consisting of aminotriazole, sodium-α,α-dichloropropionate, sodium chlorate, sodium borate, sodium trichloroacetate, magnesium chlorate, ammonium sulfamate, sodium 4-amino-2,3,6-trichloropicolinate, sodium 2,3,6-trichlorophenylacetate and sodium polychlorobenzoate.

2. A method according to claim 1, wherein the polyhalobenzyloxyalkanol sulfate is sodium 2,3,6-trichlorobenzyloxyethyl sulfate and the other compound is sodium chlorate.

3. A composition for the control of weeds comprising a phytotoxic amount of polyhalobenzyloxyalkanol sulfate of the formula:

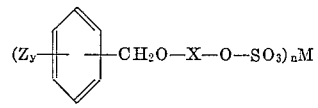

wherein
  (a) Z is a halogen selected from the group consisting of chlorine and bromine,
  (b) y is from about 2 to 4 inclusive,
  (c) X is selected from the group consisting of alkylene, alkylene-oxy-alkylene, hydroxyalkylene, alkylalkylene, and hydroxyalkylalkylene, said radicals containing 2 to 20 carbon atoms,
  (d) M is a cation selected from the group consisting of alkali metal, alkaline earth metal, ammonium, alkyl substituted ammonium hydroxyalkyl substituted ammonium, aluminum, iron, copper, zinc, lead and nickel, wherein each of said alkyl group is of 1 to 18 carbon atoms,
  (e) n represents the valence of said cation, and
  (f) a formulation adjuvant selected from the group consisting of aminotriazole, sodium-α,α-dichloropropionate, sodium chlorate, sodium borate, sodium trichloroacetate, magnesium chlorate, ammonium sulfamate, sodium 4-amino-2,3,6-trichloropropicolinate, sodium 2,3,6-trichlorophenylacetate and sodium polychlorobenzoate.

4. A composition for the control of weeds comprising a phytotoxic amount of a polyhalobenzyloxyalkanol sulfate of the formula:

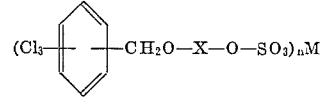

wherein
  X is alkylene of two to eight carbon atoms,
  M is a cation selected from the group consisting of alkali metal, alkaline earth metal, ammonium alkyl substituted ammonium hydroxyalkyl substituted ammonium, aluminum, iron, copper, zinc, lead and nickel, wherein each of said alkyl groups is of 1 to 18 carbon atoms, and
  n represents the valence of said cation, and sodium borate.

References Cited

UNITED STATES PATENTS

| 2,708,675 | 5/1955 | Slagh | 260—457 |
| 2,802,027 | 8/1957 | Gaertner | 71—103 X |
| 3,193,569 | 7/1965 | Schmidt-Nickels | 260—458 |
| 3,338,702 | 8/1967 | Newcomes et al. | 71—103 X |

JAMES O. THOMAS, JR., Primary Examiner.

U.S. Cl. X.R.

71—97, 94, 95, 103

PO-1050
(5/69)

UNITED STATES PATENT OFFICE
CERTIFICATE OF CORRECTION

Patent No. 3,429,687          Dated February 25, 1969

Inventor(s) Edward D. Weil

It is certified that error appears in the above-identified patent and that said Letters Patent are hereby corrected as shown below:

Column 2, line 60, the word after "monononylammonium" should read as-- monodecylammonium---.
Column 6, line 16, after "exert" insert---a---.
Column 10, line 38, the word after "-2,3,6-" should read as--- trichloropico- ---.

SIGNED AND
SEALED
APR 28 1970

(SEAL)
Attest:

Edward M. Fletcher, Jr.
Attesting Officer

WILLIAM E. SCHUYLER, J
Commissioner of Patent